United States Patent
Landais et al.

(10) Patent No.: US 11,218,514 B2
(45) Date of Patent: Jan. 4, 2022

(54) ACCESS TO LOCAL SERVICES BY UNAUTHENTICATED USERS

(71) Applicant: NOKIA SOLUTIONS AND NETWORKS OY, Espoo (FI)

(72) Inventors: Bruno Landais, Lannion (FR); Peter Leis, Penzberg (DE); Keith Drage, Bristol (GB)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 407 days.

(21) Appl. No.: 16/312,667

(22) PCT Filed: Jun. 15, 2017

(86) PCT No.: PCT/EP2017/064709
§ 371 (c)(1),
(2) Date: Dec. 21, 2018

(87) PCT Pub. No.: WO2017/220432
PCT Pub. Date: Dec. 28, 2017

(65) Prior Publication Data
US 2019/0327615 A1    Oct. 24, 2019

(30) Foreign Application Priority Data
Jun. 21, 2016 (EP) .................... 16175589

(51) Int. Cl.
*H04W 12/08* (2021.01)
*H04L 29/06* (2006.01)
(Continued)

(52) U.S. Cl.
CPC ........ *H04L 65/1016* (2013.01); *H04L 65/105* (2013.01); *H04L 65/1006* (2013.01);
(Continued)

(58) Field of Classification Search
CPC ............. H04L 65/1016; H04L 65/1006; H04L 65/105; H04L 65/1069; H04L 65/1073; H04W 12/086; H04W 4/50; H04W 4/20
See application file for complete search history.

(56) References Cited

U.S. PATENT DOCUMENTS

2009/0047922 A1* 2/2009 Buckley ................ H04W 76/50
455/404.1
2009/0197572 A1 8/2009 Feder et al.
(Continued)

FOREIGN PATENT DOCUMENTS

CN   102065399 A    5/2011
EP   2536103 A1    12/2012
(Continued)

OTHER PUBLICATIONS

Office Action for Japanese Application No. 2018-566917 dated Nov. 24, 2020.
(Continued)

*Primary Examiner* — Gil H. Lee
*Assistant Examiner* — Juan C Turriate Gastulo
(74) *Attorney, Agent, or Firm* — Alston & Bird LLP

(57) ABSTRACT

Embodiments of the invention include a User Equipment UE, configured to: support access, via a serving network referred to as local network including an IMS network accessed by a PS domain, without user authentication, to services referred to as Local Services, including non-emergency services.

14 Claims, 1 Drawing Sheet

(51) Int. Cl.
   *H04W 4/50*     (2018.01)
   *H04W 4/20*     (2018.01)
   *H04W 12/086*   (2021.01)

(52) U.S. Cl.
   CPC ...... *H04L 65/1069* (2013.01); *H04L 65/1073* (2013.01); *H04W 4/20* (2013.01); *H04W 4/50* (2018.02); *H04W 12/086* (2021.01)

(56) References Cited

U.S. PATENT DOCUMENTS

| | | |
|---|---|---|
| 2010/0195570 A1 | 8/2010 | Tamura et al. |
| 2011/0092253 A1 | 4/2011 | Amiel et al. |
| 2011/0136471 A1 | 6/2011 | Chen et al. |
| 2012/0135713 A1* | 5/2012 | Lee .................... H04W 8/02 455/411 |
| 2013/0060954 A1* | 3/2013 | Dahlqvist ........... H04L 65/1069 709/228 |
| 2013/0309993 A1 | 11/2013 | Nishida et al. |
| 2016/0183156 A1* | 6/2016 | Chin .................. H04L 61/2007 370/331 |
| 2016/0242227 A1 | 8/2016 | Sun |
| 2017/0006514 A1* | 1/2017 | Kiss .................... H04L 45/745 |
| 2018/0063688 A1* | 3/2018 | Lindholm ........... H04L 65/1016 |

FOREIGN PATENT DOCUMENTS

| | | |
|---|---|---|
| JP | 2010 533994 A | 10/2010 |
| JP | 2011 523236 A | 8/2011 |
| JP | 2012 169872 A | 9/2012 |
| WO | WO 2013/053365 A1 | 4/2013 |
| WO | WO 2015/062065 A1 | 5/2015 |

OTHER PUBLICATIONS

Office Action for Indian Patent Application No. 201947002257 dated Jan. 11, 2021, 7 pages.
Office Action for European Application No. 16175589.7 dated Aug. 21, 2020, 7 pages.
RF system information blocks-MIB,SIB-1,2,3,4,5,6,7,8,9,10,11 (RF Wireless World-Home of RF and Wireless Vendors and resources) [online] [retrieved Jan. 25, 2019], Retrieved from the Internet via the Wayback Machine: <URL: https://web.archive.org/web/20151217113545/http://www.rfwireless-world.com/Terminology/LTE-MIB-SIB-system-information-blocks.html. (Dec. 17, 2015) 5 pages.
International Search Report and Written Opinion for Application No. PCT/EP2017/062383 dated Jul. 14, 2017. 10 pages.
International Search Report and Written Opinion for Application No. PCT/EP2017/064709 dated Jul. 14. 2017, 11 pages.
European Search Report for Application No. EP 16 175 589.7 dated Nov. 2, 2016, 7 pages.
Office Action for European Application No. 16 175 589.7 dated Jan. 7, 2020, 6 pages.
Office Action for Japanese Application No. 2018-566917 dated Dec. 10, 2019, 10 pages.
Camarillo, G., *IMS Standard Text*, Ric telecom, Sections 3.2.4, 14.2 and 14.5 (Mar. 25, 2010), 7 pages.
Office Action for Chinese Application No. 2017800391149 dated Apr. 6, 2021, 11 pages.
Nokia et al., "New SID Proposal for Provision of Local Operator Services", 3GPP TSG-SA WG-1 Meeting #75, S1-162270, (Aug. 22-26, 2016), 6 pages.
Research in Motion UK Ltd., "Correcting Inconsistent Requirements for R-URI Emergency URN Use", 3GPP TSG-CT WG1 Meeting #82bis, C1-131728, (Apr. 8-12, 2013), 7 pages.

* cited by examiner

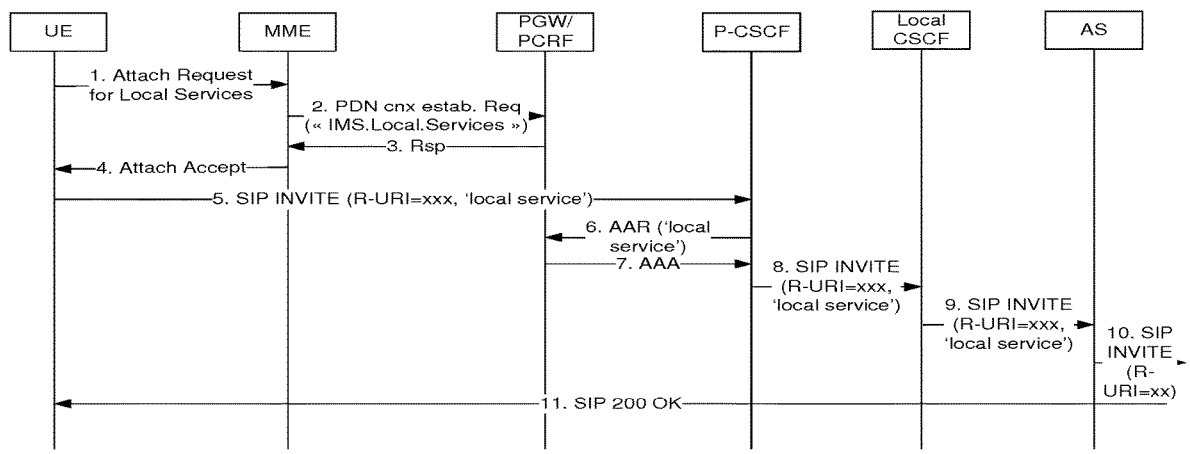

ACCESS TO LOCAL SERVICES BY UNAUTHENTICATED USERS

CROSS-REFERENCE TO RELATED APPLICATIONS

The present application is a national phase entry of International Application No. PCT/EP2017/064709, filed Jun. 15, 2017, which claims priority to European Application No. 16175589.7, filed Jun. 21, 2016, all of which are incorporated herein by reference in their entirety.

The present invention generally relates to communication networks and systems, in particular mobile communication networks and systems.

Descriptions of mobile networks and systems can be found in the literature, such as in particular in Technical Specifications published by standardization bodies such as for example 3 GPP ($3^{rd}$ Generation Partnership Project).

In general, in a mobile communication system, a User Equipment UE has access to services via a serving network (serving PLMN). In particular, a UE can have access to services via a serving network including an IMS network accessed by a PS domain (such as EPC for LTE-based UE).

As recognized by the inventors and as will be described based on examples, access to special, non-emergency, services via a serving or visited network including an IMS network accessed by a PS domain, is not supported for unauthenticated users by current standard specifications.

Network and system improvements are needed for such support.

Embodiments of the present invention in particular address such needs. An example of services supported by embodiments of the present invention is the self activation of operator subscription by LTE-based UEs, whereby users call a special number to activate their subscription.

These and other objects are achieved, in one aspect, by a User Equipment UE, configured to:
  support access, via a serving network referred to as local network including an IMS network accessed by a PS domain, without user authentication, to services referred to as Local Services, including non-emergency services.

These and other objects are achieved, in another aspect, by a PS domain entity, configured to:
  support access, by unauthenticated users, via a serving network referred to as local network including an IMS network accessed by said PS domain, to services referred to as Local Services, including non-emergency services.

These and other objects are achieved, in another aspect, by an IMS network entity, configured to:
  support access, by unauthenticated users, via a serving network referred to as local network including said IMS network accessed by a PS domain, to services referred to as Local Services, including non-emergency services.

These and other objects are achieved, in another aspect, by a RAN entity, configured to:
  broadcast system information indicating if access to Local Services is supported by a local network, in a system supporting access, by unauthenticated users, via a serving network referred to as local network including an IMS network accessed by a PS domain, to services referred to as Local Services, including non-emergency services.

These and other objects are achieved, in another aspect, by method(s) for operating at least one of above mentioned entities of a mobile system (User Equipment, PS domain entity, IMS network entity, RAN entity), comprising at least one step performed by the thus configured entities.

Some embodiments of apparatus and/or methods in accordance with embodiments of the present invention will be described, by way of example only, with reference to the accompanying drawing, intended to illustrate, in a simplified way, an example of signaling flow for access to Local Services by an unauthenticated user, according to embodiments of the invention.

BRIEF DESCRIPTION OF THE DRAWING

FIG. 1 illustrates an example of signal flow for access to Local Services by an unauthenticated user according to an embodiment of the invention.

DESCRIPTION OF VARIOUS ASPECTS AND/OR EMBODIMENTS OF THE INVENTION

By way of example, the case of LTE-based UEs and of a PS domain corresponding to EPC accessed by E-UTRAN is more particularly considered in this description. However, it should be noted that embodiments of the invention are not limited to such example.

Some operators wish to enable UEs without a UICC (or with a damaged UICC) or with a "inactive" UICC or never activated UICC (i.e. without a corresponding valid subscription in the HSS) to access local service numbers with special usage, in the serving or visited PLMN, either for emergency call or operator usage.

One example use case is to support self activation of LTE devices: UEs that have not yet obtained valid operator contract and thus have not a valid subscriber profile in the operator network can attach to the network but only for the purpose of accessing an operator for self activation. After the subscriber signs the device up for an operator contract, the subscriber becomes a normal subscriber.

Other examples include accesses e.g. to IVR/Operator service, Concierge service, Operator customer care service, public information services.

Embodiments of this invention address the non-emergency use cases. Per existing 3 GPP specifications, UEs without an authenticated IMSI cannot Attach to E-UTRAN and therefore cannot establish normal calls and the underlying LTE bearers.

No standards solution exists to support such requirements. Embodiments of the invention enable to support such requirements.

Embodiments of the invention define a new "Attach for Local Services" procedure, which enables UEs in limited service state (e.g. UICC-less UE or UE with a non activated UICC) to register to E-UTRAN to get access to local service numbers with special usage, in the serving or visited PLMN, for non-emergency services.

In some embodiments:
  A UE which attaches for Local Services skips the IMS registration and in order to receive local services sends a SIP INVITE request to a local P-CSCF (in the serving or visited PLMN). From the Request-URI used, the local P-CSCF identifies this is a permitted call without prior registration and authentication. The IMS call is routed from the P-CSCF to a specific local CSCF and then to an Application Server known to support this feature. The Application Server only allows calls to local services, other calls are blocked.

In some embodiments:

The use of this new feature is permitted or not per the serving or visited operator's policy. The support of (and permission to use) this feature may be broadcasted by the RAN in the system information broadcast (SIB).

Embodiments of the invention are not only applicable to a PS domain accessed by E-UTRAN, e.g. embodiments of the invention are also applicable to a PS domain accessed by UTRAN.

Some embodiments of the invention define a new "Attach for Local Services" procedure, which enables UEs in limited service state (e.g. UICC-less UE or UE with a non activated UICC) to register to E-UTRAN to get access to local service numbers with special usage, in the visited (local) PLMN.

In some embodiments, part or all of the following EPC principles may apply for the new Attach Type for "Local Services":

1. The MME is configured with MME Configuration Data for Local Services (including the APN to use for Local Service, QoS, PGW FQDN etc).
2. The MME skips the authentication and security procedures during an Attach for Local Services, or the MME accepts that the authentication fails and continue with the Attach procedure.
3. No NAS security (integrity, ciphering) is performed.
4. The MME shall not send an Update Location Request to the HSS, or the MME shall ignore any unsuccessful Update Location Answer from the HSS and continue with the Attach procedure. The MME shall not check access restriction.
5. A specific APN is used for "Local Service" (e.g. "IMS.Local.Services"). This APN identifies "Local Services" in the PGW and PCRF.
6. The PCRF shall only allow IMS sessions for Local Services: i.e. the P-CSCF needs to provide a 'local service' indicator to the PCRF at session setup. The UE shall provide such indication in the SIP INVITE request.
7. The MME rejects any attempt to establish another PDN connection. UE requested PDN connectivity requests are not allowed for Attach for Local Services.

In some embodiments:

The use of this new feature is permitted or not per the visited (local) operator's policy. The support of (and permission to use) this feature may be broadcast by the RAN in the system information (SIB).

In some embodiments:

A UE without a UICC can initiate the Attach for Local Services.

A UE with an "inactive" UICC (i.e. without a corresponding valid subscription in the HSS) gets rejected when doing a normal Attach with a cause indicating that the user is not authenticated. This UE may initiate then an Attach for Local Services, to access to local services in the visited PLMN.

In some embodiments, part or all of the following IMS principles may apply for the new Attach Type for "Local Services":

8. A UE attached for Local Services skips the IMS registration.
9. The UE sends a SIP INVITE request to a local P-CSCF. The IMS call is routed from P-CSCF to a specific local CSCF and then to an Application Server AS known to support this feature. Application Server AS only allows calls to local services, other calls are blocked.
10. The SIP INVITE request has an R-URI with the new 'local service" indication. An example for such an indication is to use a service specific URN that identifies the local services. This resolves the problem of different local services numbers used by different network operators, and ensures that the local P-CSCF does not need an extensive table to match such numbers.
11. The P-CSCF provides a 'local service' indicator to the PCRF at session setup (see 6 above).
12. The call is routed to a local CSCF, where filter criteria on the service URN may well identify a specific application to support the service request.

In some embodiments:

A UE that is roaming and is unauthenticated can Attach for Local Services in the visited PLMN and access Local Services in the visited PLMN. A UE without a UICC has no designated network and will therefore either find, or allow the user to select, a local network.

In some embodiments:

With UICC-less UE or unauthenticated IMSI, the IMEI of the UE can be used in the EPC to identify the UE. The IMSI, if available, can be passed on in the EPC signaling with an "unauthenticated" flag.

FIG. 1 is intended to illustrate, in a simplified way, an example of signaling flow for access to Local Services by an unauthenticated user, according to embodiments of the invention. FIG. 1 shows a simplified call flow, focusing on some key principles.

In some embodiments, EIR mechanisms can be applied as for existing 3 GPP procedures.

In some embodiments, part or all of following steps may be performed:

1. The UE requests to Attach for Local Services.
2. The MME establishes a PDN connection, using the APN configured for local services, towards a PGW configured in its Configuration Data for Local Services.
5. After the Attach is completed, the UE sends a SIP INVITE request including a 'local service' indication.
6. The P-CSCF forwards the 'local service' indication to the PCRF during the IMS session setup. This enables to ensure that the SIP session established over the PDN connection is only used to access Local Services.
8. The P-CSCF routes the SIP session for Local Services towards a Local CSCF known to support Local Services.
9. The Local CSCF routes the SIP session for Local Services towards an AS known to support Local Services.
10. The AS only allows the IMS session to use Local Services. The AS routes the call towards the Local Service.
11. The SIP session for Local Services is established. The SIP 200 OK can be preceded by other provisional responses as appropriate for the mechanism of handling the call.

Embodiments of the invention thus enable unauthenticated users to get access to Local Services with special usage in the serving or visited PLMN, via the PS domain and IMS. The Local Services can be for operator usage. An example is the self activation of operator subscription, whereby users call a special number to activate their subscription. Embodiments of the invention provide new service opportunities for operators.

Acronyms:

APN Access Point Name
AS Application Server
CSCF Call Session Control Function
EIR Equipment Identity Register
EPC Evolved Packet Core
E-UTRAN Evolved Universal Terrestrial Radio Access Network FQDN Fully Qualified Domain Name
HSS Home Subscriber Server
ISD Insert Subscriber Data
IMSI International Mobile Subscriber Identity
IMEI International Mobile Station Equipment Identity
IMS IP Multimedia Subsystem
IMSI International Mobile Subscriber Identity
IVR Interactive Voice Response
LTE Long Term Evolution
MME Mobility Management Entity
PCRF Policy and Charging Rules Function
P-CSCF Proxy- Call Session Control Function
PS Packet-Switched
QoS Quality of Service
RAN Radio Access Network
SIP Session Initiation Protocol
PDN Packet Data Network
PGW PDN Gateway
PLMN Public Land Mobile Network
UE User Equipment
UICC Universal Integrated Circuit Card
URI Uniform Resource Identifier
URN Uniform Resource Name
UTRAN Universal Terrestrial Radio Access Network Various aspects and/or embodiments of the invention include (though not being limited to) following aspects and/or embodiments.

Some aspects are related to a User Equipment UE.

Various embodiments are provided, including (though not being limited to) following embodiments, which may be taken alone or in combination, according to various combinations.

In an embodiment, said User Equipment UE is configured to:
support access, via a serving network referred to as local network including an IMS network accessed by a PS domain, without user authentication, to services referred to as Local Services, including non-emergency services.

In an embodiment, said User Equipment UE is configured to:
provide, in an Attach request to said PS domain, an indication that said Attach is for access to said Local Services.

In an embodiment, said User Equipment UE is configured to:
skip IMS registration prior to establishing an IMS session for access to said Local Services.

In an embodiment, said User Equipment UE is configured to:
send a SIP INVITE request for IMS session establishment, with an indication that this is for access to said Local Services, towards a P-CSCF, referred to as local P-CSCF, in said local network.

In an embodiment, said User Equipment UE is configured to:
provide a Local Service indication with a Request-URI in a SIP INVITE request for IMS session establishment for access to said Local Services.

In an embodiment:
said Local Service indication includes a Local Service-specific URN.

In an embodiment, said User Equipment UE is configured to:
initiate procedures to access to said Local Services, without user authentication, only if access to Local Services is supported by said local network.

In an embodiment, said User Equipment UE is configured to:
receive broadcast system information, indicating if said access to Local Services is supported by said local network.

Other aspects are related to a PS domain entity.

Various embodiments are provided, including (though not being limited to) following embodiments, which may be taken alone or in combination, according to various combinations.

In an embodiment, said PS domain entity is configured to:
support access, by unauthenticated users, via a serving network referred to as local network including an IMS network accessed by said PS domain, to services referred to as Local Services, including non-emergency services.

In an embodiment, said PS domain entity, such as MME for EPC, is configured to perform at least one of:
receive an Attach request including an indication that said Attach is for access to said Local Services,
skip authentication during an Attach procedure for access to said Local Services, or accept that the authentication fails and continue with the Attach procedure,
not perform NAS security,
send no Update Location Request to the HSS, or ignore any unsuccessful Update Location Answer from the HSS and continue with the Attach procedure,
establish a PDN connection, using Configuration Data for Local Services, for a UE attached for access to said Local Services,
reject any attempt to establish another PDN connection.

In an embodiment, said Configuration Data include at least one of:
an APN to use for access to said Local Services,
a FQDN of a PGW to use for access to said Local Services,
a QoS required for a PDN connection for access to said Local Services.

In an embodiment, said PS domain entity, such as PCRF, is configured to:
receive from a P-CSCF a Local Service indication, at IMS session establishment for access to said Local Services,
based on said Local Service indication, only allow IMS session for said Local Services.

Other aspects are related to a IMS network entity.

Various embodiments are provided, including (though not being limited to) following embodiments, which may be taken alone or in combination, according to various combinations.

In an embodiment, said IMS network entity is configured to:
support access, by unauthenticated users, via a serving network referred to as local network including said IMS network accessed by a PS domain, to services referred to as Local Services, including non-emergency services.

In an embodiment, said IMS network entity comprises a P-CSCF configured to perform at least one of:
receive a SIP INVITE request for IMS session establishment, said request including a Request-URI with a Local Service indication,
forward to the PCRF the Local Service indication, at IMS session establishment for access to said Local Services,
based on said Local Service indication, route the request to a local CSCF in said local network, referred to as local CSCF, supporting said Local Service.

In an embodiment:
said Local Service indication includes a Local Service-specific URN.

In an embodiment, said IMS network entity comprises a local CSCF configured to:
receive a SIP INVITE request for IMS session establishment, said request including a Request-URI with a Local Service indication,
based on said Local Service indication, route the request to an application server supporting said Local Service.

In an embodiment:
said Local Service indication includes a Local Service-specific URN.

In an embodiment said IMS network entity comprises a local CSCF configured to:
use filter criteria on said Local Service indication, to identify said application server.

In an embodiment, said IMS network entity comprises an application server configured to:
receive a SIP INVITE request for IMS session establishment, said request including a Request-URI with a Local Service indication,
route the request to said Local Service.

In an embodiment, said IMS network entity comprises an application server configured to:
allow IMS session establishment only for said Local Service.

Other aspects are related to a RAN entity.

Various embodiments are provided, including (though not being limited to) following embodiments.

In an embodiment, said RAN entity is configured to:
broadcast system information indicating if access to Local Services is supported by a local network, in a system supporting access, by unauthenticated users, via a serving network referred to as local network including an IMS network accessed by a PS domain, to services referred to as Local Services, including non-emergency services.

Other aspects are related to method(s) for operating at least one of above mentioned entities of a mobile system (User Equipment, PS domain entity, IMS network entity, RAN entity), comprising at least one step performed by the thus configured entities.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The invention claimed is:

1. An apparatus comprising:
at least one processor; and
at least one memory including computer program code;
the at least one memory and the computer program code configured to, with the at least one processor, cause the apparatus to:
support access, via a serving operator's network referred to as a local network including an internet protocol multimedia subsystem (IMS) network accessed by a packet-switched domain, by an unauthenticated user, to non-emergency local services in said local network, per a local operator's policy, said support comprising:
receiving broadcast system information indicating if said access to local services is supported by said local network per the local operator's policy; and
in a limited service state, providing, in an attach request to said packet-switched domain, during an attach for local services procedure, an indication that said attach is for said access to said local services,
wherein a user equipment being in a limited service state includes one of a user equipment being without a universal integrated circuit card, or a user equipment getting rejected during an attach procedure with a cause indicating that a user is not authenticated.

2. The apparatus according to claim 1, the at least one memory and the computer program code configured to, with the at least one processor, cause the apparatus at least to:
skip IMS registration prior to establishing an IMS session for access to said local services.

3. The apparatus according to claim 1, the at least one memory and the computer program code configured to, with the at least one processor, cause the apparatus at least to:
send a session initiation protocol SIP invite request for IMS session establishment, with an indication that this is for access to said local services, towards a proxy-call session control function (P-CSCF), referred to as local P-CSCF, in said local network.

4. The apparatus according to claim 1, the at least one memory and the computer program code configured to, with the at least one processor, cause the apparatus at least to:
provide a local service indication with a request-uniform resource identifier (URI) in a session initiation protocol (SIP) invite request for IMS session establishment for access to said local services.

5. The apparatus according to claim 4, wherein:
said local service indication includes a local service-specific uniform resource name (URN).

6. The apparatus according to claim 1, the at least one memory and the computer program code configured to, with the at least one processor, cause the apparatus at least to:
initiate procedures to access to said local services without user authentication, if access to local services is supported by said local network.

7. The apparatus according to claim 1, wherein said local services comprise operator customer care services.

8. A method for operating a user equipment, said user equipment supporting access, via a serving network referred to as a local network including an internet protocol multimedia subsystem (IMS) network accessed by a packet-switched domain, by an unauthenticated user, to non-emergency local services in said local network, per a local operator's policy, said method comprising:
receiving broadcast system information indicating if said access to local services is supported by said local network per the local operator's policy; and
in a limited service state, providing, in an attach request to said packet-switched domain, during an attach for local services procedure, an indication that said attach is for said access to said local services,
wherein the user equipment being in a limited service state includes one of the user equipment being without a universal integrated circuit card, or the user equipment getting rejected during an attach procedure with a cause indicating that a user is not authenticated.

9. The method according to claim 8, comprising:
skipping IMS registration prior to establishing an IMS session for access to said local services.

10. The method according to claim 8, comprising:
sending a session initiation protocol (SIP) invite request for IMS session establishment, with an indication that this is for access to said local services, towards a proxy-call session control function (P-CSCF), referred to as local P-CSCF, in said local network.

11. The method according to claim 8, comprising:
providing a local service indication with a request-uniform resource identifier (URI) in a session initiation protocol (SIP) invite request for IMS session establishment for access to said local services.

12. The method according to claim 11, wherein:
said local service indication includes a local service-specific uniform resource number (URN).

13. The method according to claim 8, comprising:
initiating procedures to access to said local services without user authentication, only if access to local services is supported by said local network.

14. The method according to claim 8, wherein said local services comprise operator customer care services.

\* \* \* \* \*